Feb. 2, 1971    E. PETSCH    3,559,443
PRESSES, AND PARTICULARLY EXTRUSION PRESSES
Filed Feb. 15, 1968    6 Sheets-Sheet 1

(E")

Inventor:
Ernst Petsch

Feb. 2, 1971  E. PETSCH  3,559,443
PRESSES, AND PARTICULARLY EXTRUSION PRESSES
Filed Feb. 15, 1968  6 Sheets-Sheet 2

(A-A)

(B-B)

(C-C)

(D-D)

Inventor:
Ernst Petsch

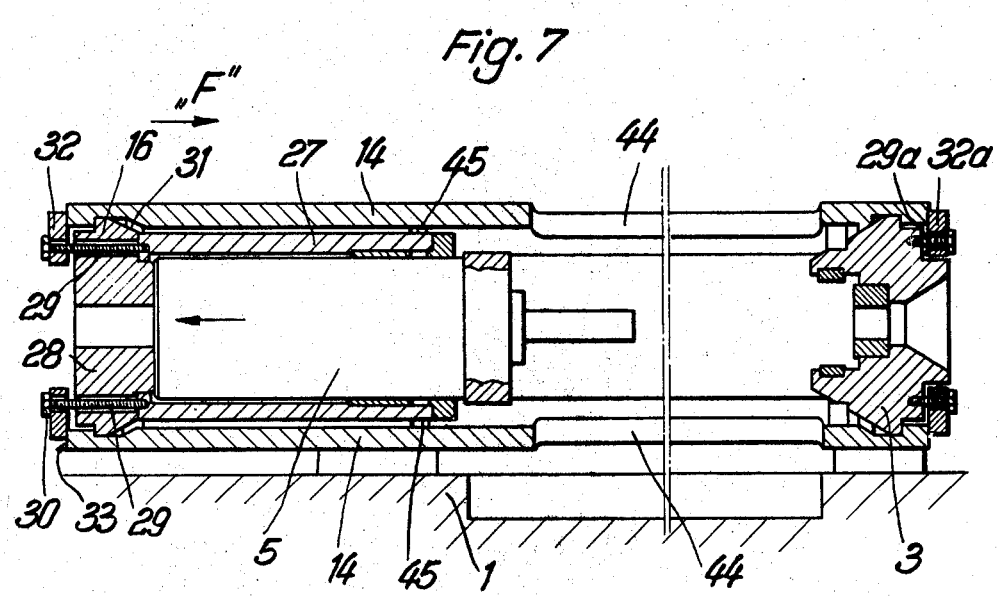
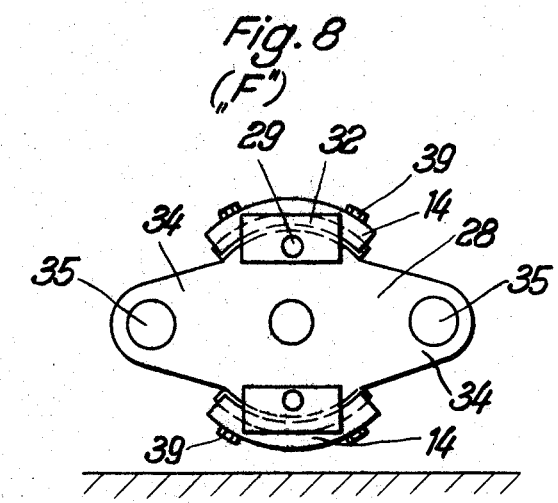

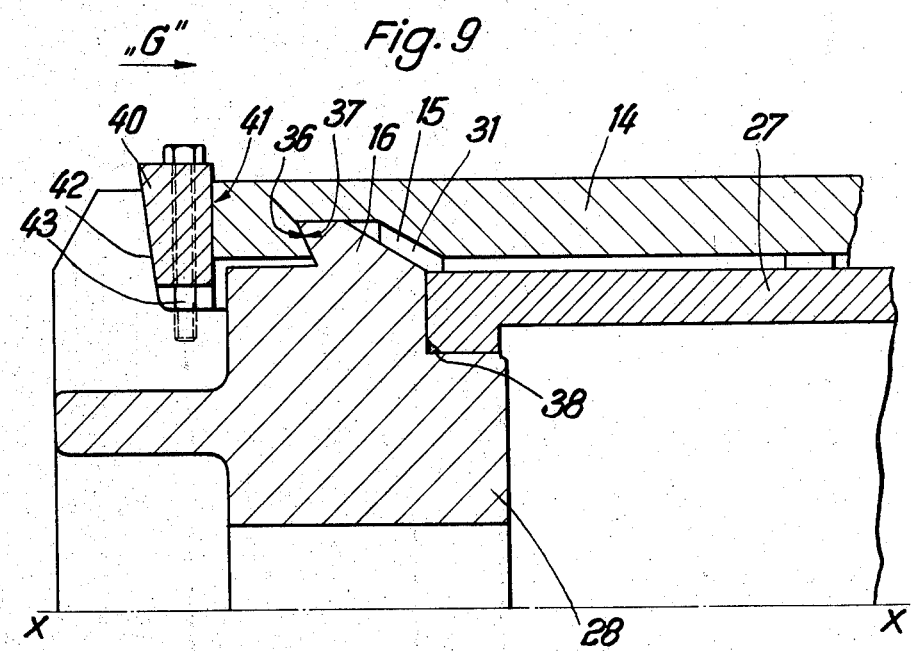
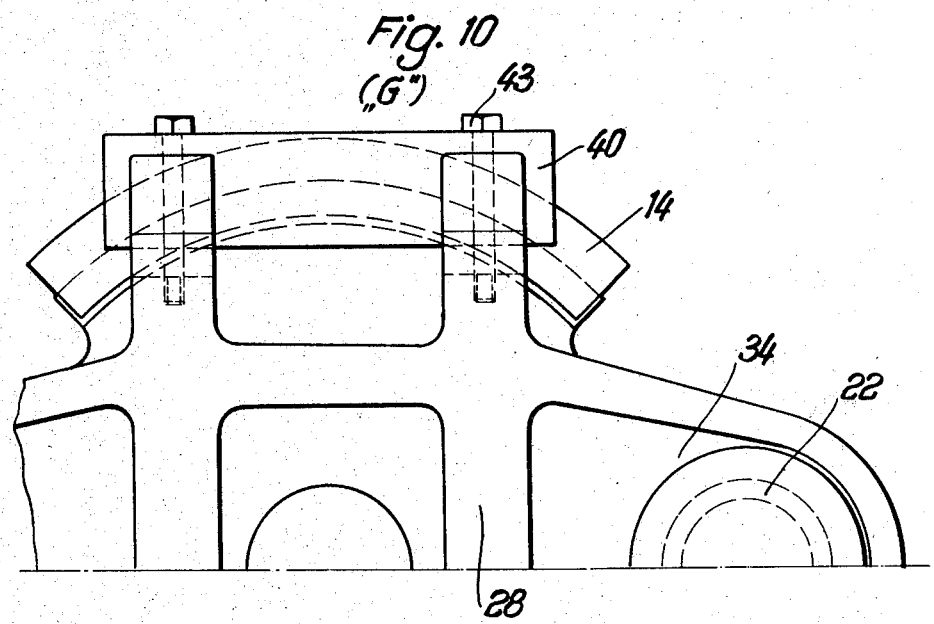

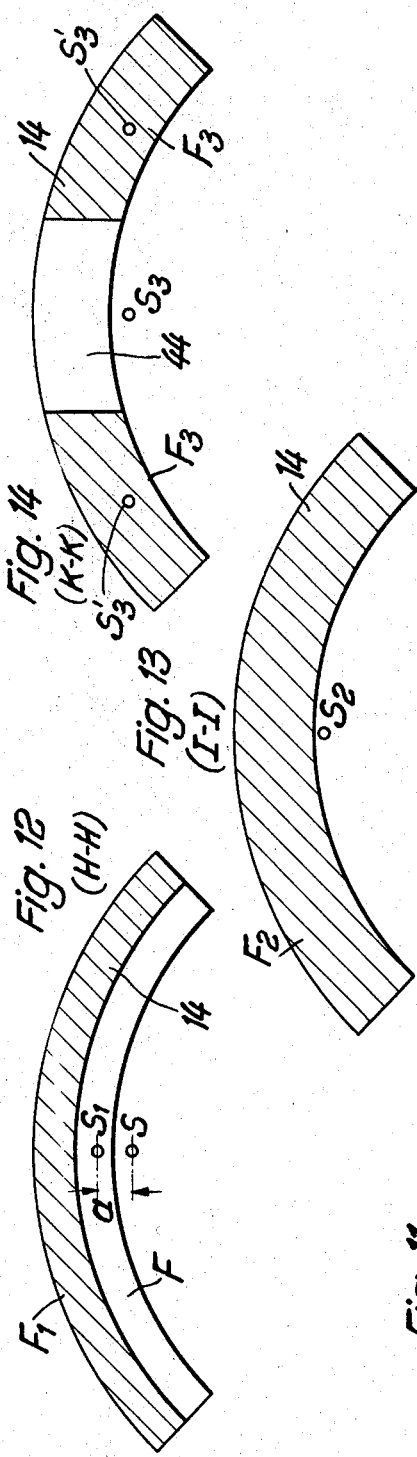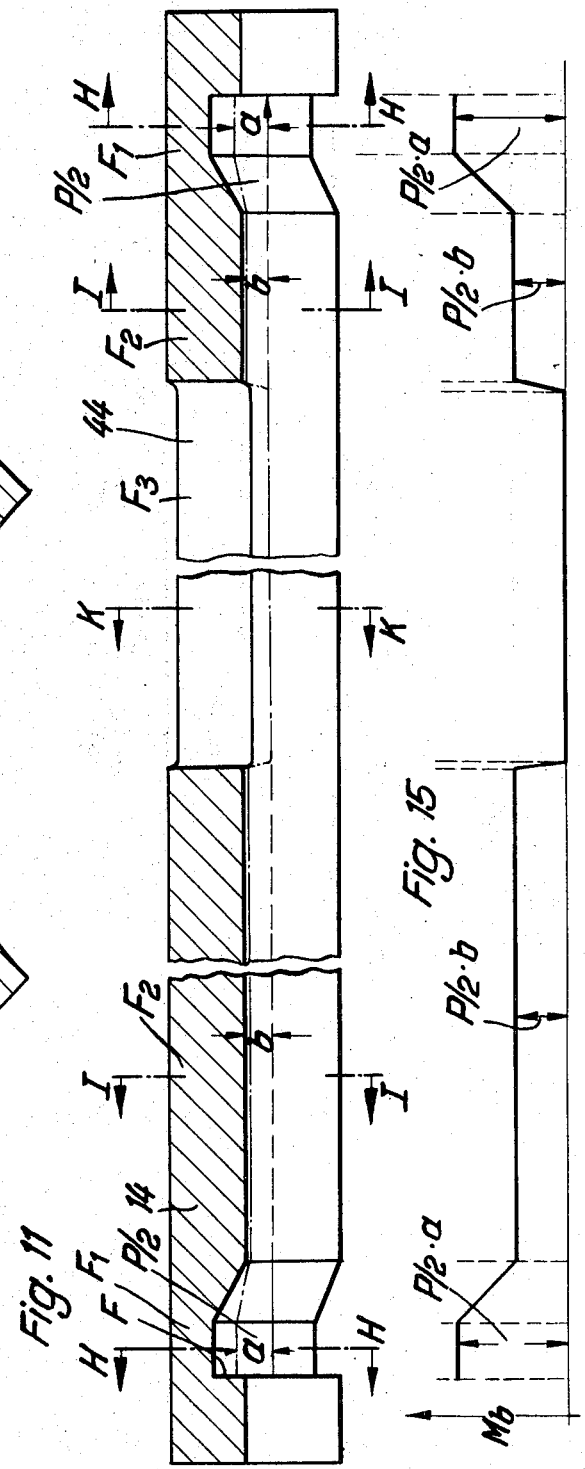

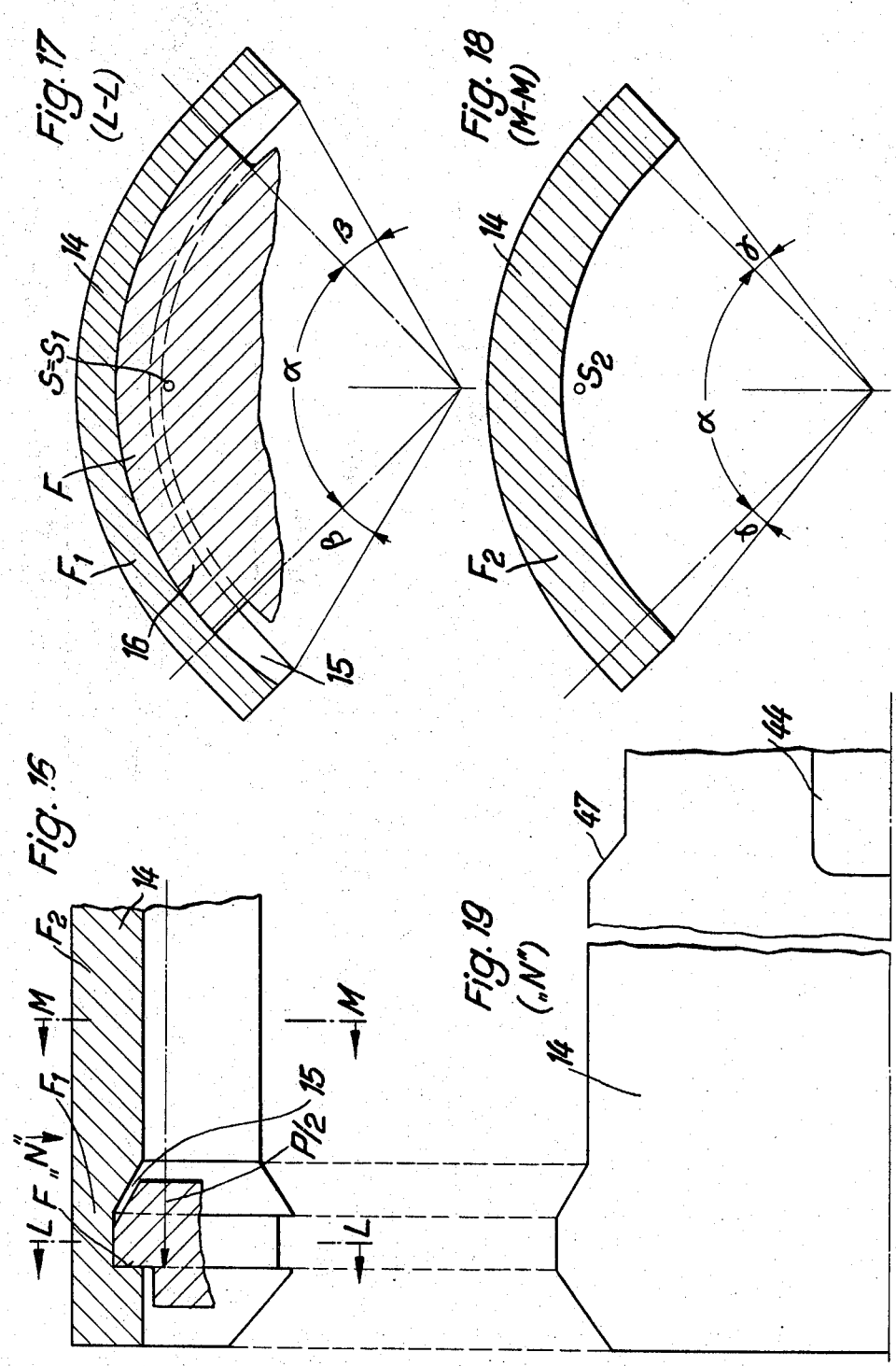

United States Patent Office 3,559,443
Patented Feb. 2, 1971

3,559,443
PRESSES, AND PARTICULARLY EXTRUSION PRESSES
Ernst Petsch, Mettmann, Germany, assignor to Maschinenfabrik Sack G.m.b.H., Dusseldorf-Rath, Germany
Filed Feb. 15, 1968, Ser. No. 705,823
Claims priority, application Germany, Feb. 17, 1967, M 72,806
Int. Cl. B21c 23/00
U.S. Cl. 72—253
11 Claims

ABSTRACT OF THE DISCLOSURE

A press in which the press cylinder and die support beams are tied together by two or more segments extending part way but less than 180° around the axis of the cylinder.

Figure 1:
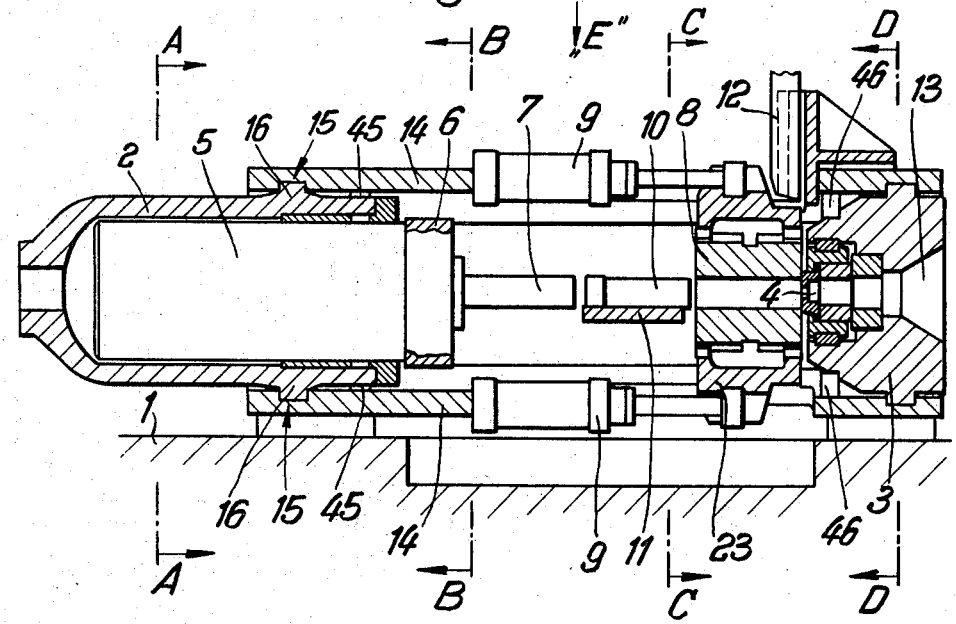

In presses, and particularly in extrusion presses, the press cylinder is usually connected to the die support beam, which takes the reaction thrust, by tie-rods which are called columns. These columns have to withstand considerable tensile forces during the pressing operation. The columns function as tie-rods which are screw-connected with the press cylinder on the one hand and with the die support beam on the other hand. The columns are positioned far to one side of the centrally applied force, and consequently are subjected to large bending moments, which they transmit to the cylinder support and the die support, which there tend to deform, bowing outwards away from one another into a funnel shape. The columns are firmly fixed to these parts and become somewhat bowed by the deformation of the cylinder and die support. As a consequence the columns are no longer able to guide correctly longitudinally mobile parts such as a plunger carriage and an ingot receiver. It becomes necessary to provide, in the customary column presses, an independent guide frame which is not subject to deformations due to the pressing forces, but merely has to support weights. The funnel-shaped deformation of the die support beam also involves a risk that pressing tools, such as a die support and the die itself, no longer sit flat and can crack. The accuracy of the pressed product also suffers, unless the die support beam is of extremely rigid construction.

In order to reduce the bending stresses it has already been proposed to make the connection between the press cylinder and the die support beam in the form of a frame which connects the two together, takes the tensile stress and is of cylindrical shape (British patent specification 393,917, U.S. patent specification 2,403,822). By this means the structural elements which withstand the tensile force are brought nearer to the press axis and the lever arms which determine the bending moments are correspondingly shortened. The present invention starts out from a construction of this kind.

The already known presses of this kind have, for taking the tensile force, a single cylinder which has one or more side apertures. However, this arrangement involves a press frame of complicated shape which is extremely difficult and expensive to manufacture and machine. These disadvantages are so serious that this type of press has not achieved success on the market in competition with the customary column type.

In accordance with the present invention, a press has a press cylinder and a die support beam which are interconnected by a frame, which is in use subjected to tensile forces due to reaction on the cylinder, and which comprises at least two segments extending part way around the axis of the cylinder, each of the segments being connected at one end to the cylinder and at the other end to the die support beam and subtending an angle of less than 180° at the axis of the cylinder.

Each segment can be a simple shell, easily manufactured by hot bending a simple plate. The segment does not require any machining, except at its end faces, unless the segments are also used for guiding axially mobile parts of the press, in which case the shell should be machined along its longitudinal edges. Thus the invention combines the advantages of the already known column type of construction, with those of the already known cylinder type, while at the same time eliminating the disadvantages of both these types.

The segments are usually circular arcs in cross-section, so that together they form a frame of circular cross-section. However other cross-sectional shapes can be used if desired, provided that they are approximately segments of a circular cylinder, for example the segment can have a polygonal cross-section or, if a large number of segments is used, they can be flat strips.

To connect the segments to the press cylinder to the die support beam, the press cylinder and the die support beam preferably have radially projecting collars which engage in grooves in the inner surfaces of the segments. The machining of the inner surfaces of the segments for this purpose is a comparatively simple operation.

The segments may be held in position with their grooves over the collar on the press cylinder and/or on the die support beam, by anchor pieces on the die support beam and/or the cylinder between adjacent segments which are bolted to the anchor pieces, and auxiliary rams may then be supported on the anchor pieces. Alternatively, the collars and the grooves may have inter-engaging surfaces which are conical, the arrangement being such that a component of the tensile force to which each segment is subjected in use, urges the segments inwards towards the axis of the press cylinder. This second method has the advantage that it is not necessary to use extra means for stressing the segments inwards toward the press cylinder or die support beam. If desired the cylinder, or a part of the cylinder can be formed with extensions for supporting auxiliary rams.

There are advantages in dividing the press cylinder into two parts, a cylinder proper and a detachable end cover, the cover having a collar which engages with the segments. With this arrangement the press cylinder, which in the customary constructions has to take the form of a complicated casting, becomes much simpler to manufacture. A plain cylinder, open at both ends, is much simpler to cast or forge and to machine than a cylinder which has one end closed. As it is inadvisable to weld the end cover to the cylinder body, a seal is necessary between these two parts, and this seal can become damaged after a certain length of working time. It is therefore desirable that the connections between the cylinder body and the cover should be accessible from outside. After loosening these connections, the cylinder can be shifted axially out of the way, and the seals can be renewed conveniently and rapidly without having to dismantle the press.

It is a special advantage of the press according to the invention that the longitudinal edges of the segments can be used as guiding surfaces for parts of the press which moves longitudinally, for example the ingot receiver. Using these edge surfaces as the guides gives the advantage that the guiding is unaffected by thermal expansion in radial directions.

In presses in which the press cylinder and the die support beam are connected together by columns, there are large intermediate spaces available between the columns which can be used for example for accommodating rams for driving the ingot receiver. In a press constructed according to the invention spaces of this kind can be obtained by forming slots apertures in the segments. As will be described below, these apertures can have a favourable influence on the bending moments acting on the segments. The apertures can therefore be introduced even though they are not required for accommodating parts, or for giving easier access to parts.

As already mentioned at the beginning, the columns which connect the press cylinder to the die support beam in previously known presses are subjected not only to tensile stresses but also to bending deformations. The same thing applies to a lesser degree to the also ready known presses in which the press cylinder is connected to the die support beam by a cylindrical frame. These bending stresses cause a bending or bowing of the parts which is undesirable if the frame is also being used as a guide for guiding longitudinally mobile parts of the stress. In order to reduce bending of the segments in the press according to the invention in these cases, each segment may be supported, at locations a certain distance away from the connection between the segment and the press cylinder or die support beam, by at least one distance piece inserted between the inner surface of the segment and the outer surface of the press cylinder or die support beam.

The tensile force acting on each segment is applied to the segment where the collar of the press cylinder or die support beam engages with the groove in the segment. There results, in addition to the tensile stress, a bending stress which tends to bend the segment inwards. However, as already mentioned the bending moments can be reduced by the apertures in the segments. This is done by choosing the width of each aperture so that the point through which the resultant tensile force passes, coincides with the centroid of the cross section of the segment cross-section. The bending moment acting on the segment in the region of the aperture is then zero and the segment therefore does not bend in that region. If the spacers mentioned above are also present, and are positioned not too far from the ends of the aperture, then the segments scarcely deform at all in the region of the apertures, and can be used as guides, irrespective of the magnitude of the tensile force.

It is possible however, to eliminate all bending of the segments over their entire length between the two grooves. This can be done, not by removing material, as was done when the apertures were made, but rather by adding material. This is done in the region of the groove by making the angle subtended by the segment of the axis of the cylinder larger than the angle subtended by the collar, the difference being great enough to cause the point of application of the force acting between the collar and the groove to coincide with the centre of area of the segment cross-section weakened by the presence of the groove. The same principle can be applied to the region between the groove and the aperture, and where there is no aperture it can be applied over the entire remaining length of the segment. This is done as follows. In the region between the grooves the central angle of the segment, that is the angle subtended by the segment at the cylinder axis, is made greater than the central angle of the collar by an amount such that the point through which the resultant tensile force passes, coincides with the centre of area of the unweakened segment cross-section.

Figure 2:
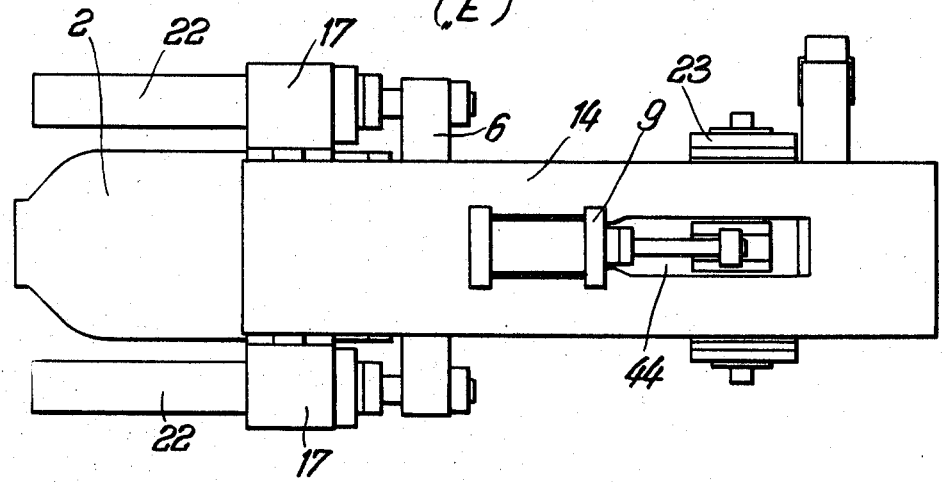
Figure 3:
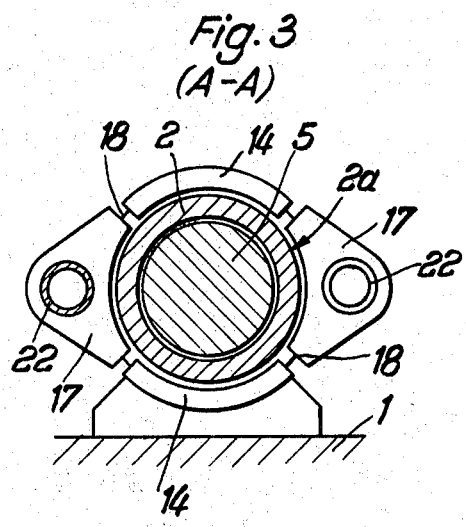
Figure 4:
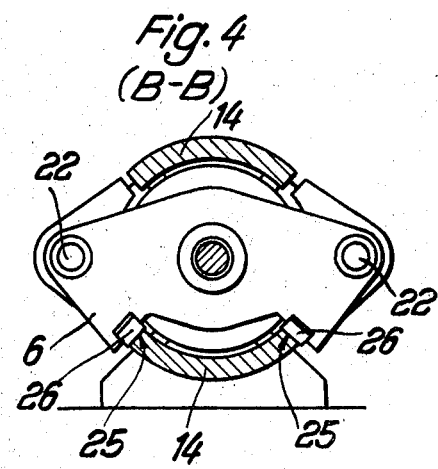
Figure 5:
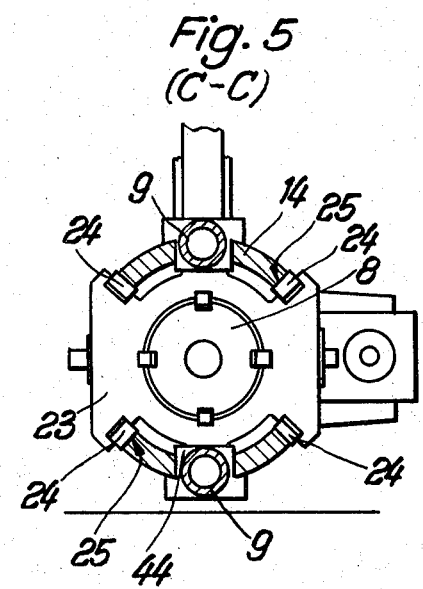
Figure 6:
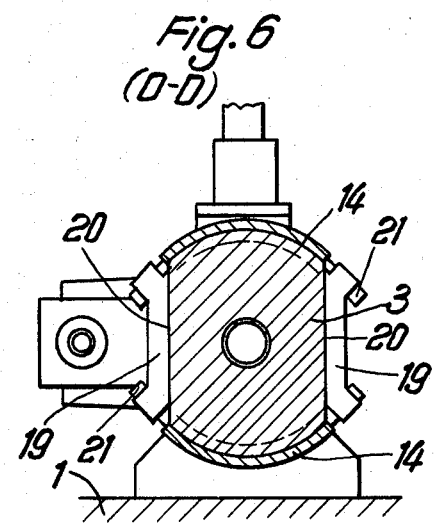

One example, with several modifications, of a press according to the invention is illustrated in the accompanying drawings, in which:

FIG. 1 is a longitudinal section through the press;
FIG. 2 is a top plan of the press;
FIG. 3 is a section taken on the line A—A in FIG. 1;
FIG. 4 is a section taken on the line B—B in FIG. 1;
FIG. 5 is a section taken on the line C—C in FIG. 1;
FIG. 6 is a section taken on the line D—D in FIG. 1;
FIG. 7 is a longitudinal section corresponding to FIG. 1 through a modified version of the invention, leaving out a few details;

FIG. 8 is a front elevation of the press of FIG. 7, that is to say seen in the direction of the arrow F in FIG. 7;
FIG. 9 is a longitudinal section showing a detail of a further modification;
FIG. 10 is a front elevation of the modification shown in FIG. 9, seen in the direction of the arrow G in FIG. 9;
FIG. 11 is a longitudinal section of one of the cylinder segments used in the press, or either modification;
FIG. 12 is a section taken on the line H—H in FIG. 11;
FIG. 13 is a section taken on the line I—I in FIG. 11;
FIG. 14 is a section taken on the line K—K in FIG. 11;
FIG. 15 is a bending moment diagram for the segment shown in FIG. 11;
FIG. 16 is a longitudinal section showing a detail of a modification of the cylinder segment of FIG. 11;
FIG. 17 is a section taken on the line L—L in FIG. 16;
FIG. 18 is a section taken on the line M—M in FIG. 16; and
FIG. 19 is a top plan of the segment shown in FIG. 16, seen in the direction of the arrow N in FIG. 16.

The extrusion press shown in FIGS. 1 and 2 is basically of the usual construction. The press rests on a foundation 1 and has a press cylinder 2 and a die support beam 3, which accommodates a die 4 together with auxiliary parts. The cylinder 2 contains a piston 5, for producing the press thrust. The front part of the piston is equipped with a carriage 6, which is guided by the press frame. On the carriage 6 there is mounted a press plunger 7. Between the cylinder 2 and the die support beam 3 there is an ingot receiver 8 which can slide axially driven by two rams 9. An ingot 10 rests initially on a feeding support block 11, which can travel sideways for feeding the ingots. From the block 11 the ingot is pushed by the plunger 7 into the receiver 8. After completion of the pressing operation the receiver 8 is retracted so that the ingot can be parted by a shear 12, which enters from above, whereupon the sheared ingot leaves the press through an opening 13 in the die support beam. The drawing does not show any of the other conventional details required in an extrusion press.

The press cylinder 2 is not connected to the die support beam by columns in the usual way, but rather by a frame which consists of two cylinder segments 14. These are shown in end view in FIG. 3 and in cross-section in FIGS. 4 to 6. Each segment 14 encloses a central angle of about 90° in the version shown in FIGS. 1 to 6. In any case the central angle is less than 180°. Each segment has near its end an internal lathe cut groove 15 in which engages an annular collar 16 of the press cylinder 2 and of the die support beam 3. This arrangement provides a positive axial connection between the cylinder 2 and the die support beam 3.

To locate the cylinder segments 14 radially, there are tension connections. In FIG. 3 the tension connection consists of two cheek pieces or anchors 17, attached to the segments 14 by tension bolts 18, which are merely indicated by centre lines in FIG. 3. Similar cheek pieces or anchors 19 attach the cylinder segments 14 to the die support beam 3, as shown in FIG. 6. In this way the die support beam 3 is clamped firmly between two flat surfaces, one at each side. The anchors 19, which are firmly clamped against the surfaces 20 of the die support beam, at the same time serve to prevent the segments 14 from rotating about the press axis. One the other hand, there is a gap between the tension anchors 17 and the outer surface 2a of the cylinder 2. The bolts connecting the tension anchors 19 to the segments 14 are shown at 21.

The anchors or cheek pieces 17, as shown in FIGS. 2 to 4, at the same time function as supports for rams 22 for driving the plunger carriage 6 and the plunger 7 back and forth before the full thrust is required for the extrusion pressing proper. The full thrust is supplied by the cylinder 2, the rams 22 adding some auxiliary thrust during the extrusion.

Parts of the press which slide longitudinally are guided by the longitudinal edges of the segments 14. In the press shown here the longitudinally sliding parts are the ingot receiver 8 and the plunger carriage 6.

As shown in FIGS. 1 and 5 the ingot receiver 8 is housed in a holder 23, which has four guide shoes 24, arranged in the form of a cross. The ingot receiver holder 23 is guided by these shoes along the four longitudinal edges 25 of the two segments 14. When the parts 8 and 23 expand thermally the guiding action of the shoes 25 still remains true and precise because the guiding surfaces 25 extend radially from the press axis.

From FIG. 4 it will be seen that the plunger carriage 6 also has shoes 26, which slide along the longitudinal edges 25 of the lower segment 14.

The modification shown in FIGS. 7 and 8 differs from that of FIGS. 1 and 2 by the fact that in FIGS. 7 and 8 the press cylinder is made in two parts, a simple pressure cylinder 27 and a back cover 28, which closes the rear end of the cylinder. These two parts are attached firmly together by axial bolts 29. An important point here is that it is not the cylinder itself but rather the back cover 28 which has the collar 16 which gives the positive connection between the cylinder and the segments 14. This fact makes it possible by loosening the bolts 29, whose heads 30 are accessible from outside, to separate the cylinder 27 from the back cover 28. The cylinder can then be pushed along for a short distance and the seal replaced which seals these two parts together. This seal is not shown in FIG. 7.

Whereas in the version of FIG. 1, the collar 16 has abutment surfaces that engage practically without play in the groove 15, in the version of FIG. 7 there is axial play between the abutment surfaces of the collar and complementary surfaces defining the groove, as shown at 31. The connection is positive when the frame 14 is under tension. In order to obtain a positive connection in the opposite direction there are cheek plates 32 which connect the parts 27, 28 and 29 to the segments 14 by contact between the cheek plates 32 and end faces 33 of the segments 14. The die support beam 3 is similarly connected to the segments 14, by means of the axial bolts 29a and the cheek plates 32a.

Whereas in the version of FIGS. 1 to 3 there are anchors 17 for supporting the rams 22 which drive the plunger carriage 6, in the version of FIGS. 7 and 8, the cylinder cover 28 can be used for this purpose. As shown in FIG. 8 the cover can have extensions in the form of wings 34 containing drillings 35 to accommodate the rams 22, which are not shown again in FIGS. 7 and 8.

In the version shown in FIGS. 3 and 6 the anchors 17 and 19 locate the segments 14 radially. The anchors become unnecessary if an arrangement as shown in FIG. 9 is used. Here the contacting surfaces 36 and 37 of the groove 15 and collar 16 are conical surfaces arranged in such a way that the tensile force produces a radial component which tends to force the segments 14 inwards the press axis X–X. With this arrangement, in order to be able to assemble the parts together, it is necessary to provide the axial play 31, which has already been shown in FIG. 7. Otherwise the version shown in FIGS. 9 and 10 agrees with that shown in FIGS. 7 and 8. In the version of FIGS. 9 and 10 the press cylinder consists of a cylinder proper 27 and a cover 28. In FIG. 9 there can be seen the seal 38, which has to be renewed from time to time. However in the version of FIGS. 7 and 8 there are not only the bolts 29, but also radial bolts 39, to locate the segments 14 radially. In contrast to this, in the version of FIGS. 9 and 10 there are only wedges 40, each wedge having a flat surface 41 and a sloping surface 42. The wedges are drawn by bolts 43 into a space between the cylinder cover 28 and the segments 14, so as to connect positively together all the parts.

As shown in FIGS. 2, 5 and 7 each segment 14 has a longitudinal slot 44. These slots accommodate the ram 9 for the ingot receiver 8, and give access for the movements of the shearing device 12. However, the slots 44 also perform an important function in reducing distortion of the segments 14. The slots therefore provide an advantage even in the case of a differently constructed press in which slots are not otherwise required. The principles involved are illustrated in FIGS. 11 to 15. In what will now follow it is immaterial whether the contacting surfaces of the groove 15 and the collar 16 are flat or conical. FIGS. 11 to 15 therefore assume, for the sake of simplicity, that these surfaces are flat.

As shown in FIGS. 11 and 12 the tension applied to one segment 14 is half of the total tension P, that is to say the tension is $P/2$. This force is distributed over the contact surface F, between the collar and the groove. The forces distributed over this surface can be represented by a single force acting at the centre of area S of the surface F. The entire cross-section of the segment 14 consists of this surface F and a second surface $F_1$. The cross-section $F_1$ has a centre of area $S_1$, which in the case of the upper segment 14 is above the point S. The distance between S and $S_1$ is the radial distance $a$. This distance $a$ is the length of the lever producing the bending moment applied by the force $P/2$ to the segment 14 and this bending moment, $aP/2$, tends to bow the segment inwards. In order to counteract this bending moment $aP/2$ and thus reduce the bending of the segment 14, there can be inserted as shown in FIG. 1 distance pieces 45 between each segment 14 and the surface of the cylinder 2, and distance pieces 46 between each segment 14 and the die support beam 3. This is often sufficient, but it does not entirely eliminate bending of the segment 14.

The bending moment acting on a segment 14 acts in the region weakened by the groove 15 on a lever arm $a$, but in the unweakened zone, which extends from the groove 15 as far as the slot 44, the lever arm is the distance $b$, between the centre of total area $S_2$ and the point S. The point $S_2$ is lower than the point $S_1$. In the region of the slot 44 the centre of total area is still further down, that is to say further radially inwards, by an amount depending on the width of the slot 44. Furthermore, the width of the slot can be chosen to bring the point $S_3$ to coincide with S, as shown in FIG. 14. There is then no bending moment in the region of the slot 44, as is illustrated on a bending moment diagram as shown in FIG. 15 where it can also be seen that the highest moments are at the two ends, and that the bending moment is already less where the centre of area $S_2$ is further inwards, at the cross-section I—I. In the region of the slot 44 the bending moment becomes zero, at the cross-section K—K. In the region of the slot the segments 14 therefore remain radially undistorted under all operating conditions. However the radial distance between the two segments in the regions before and after the slot still depend on the value of the tensile force P, unless the distance pieces 45 and 46 are positioned close to the ends of the slot 44.

In the modified segments shown in FIGS. 16 to 19 bending of the segments 14 is entirely eliminated, without resorting to any distance pieces. This is done by displacing the point S, which is the point of application of the resultant force acting on the surface F, so that the point S coincides with the centre of area. For this purpose, in the zone of the segment 14 weakened by the presence of the groove 15, the central angle subtended by the segment 14 is extended on both sides by the amount $\beta$, which is an amount such that the centre of area $S_1$ coincides with the point of application S of the tensile force $P/2$, as shown in FIG. 17. The central angle occupied by the segment 14 is therefore, in the region of the cross-section L—L. $2\beta$ more than the central angle $\alpha$ of the collar 16.

At the unweakened zone M—M the same principle is applied, as shown in FIG. 18. In this case the central angle occupied by the segment 14 is increased, compared to the central angle $\alpha$ of the collar, on both sides by an amount γ, so that here again the point of application S of the tensile force P/2 coincides with the point $S_2$, which is the centre of the total area of cross-section. In this way the bending moment can be reduced to zero over the entire length of the cylindrical segment 14 between the two grooves 15, or at least it can be reduced so far that it is negligible in practice.

A segment which has been relieved of bending stresses in this way is represented in FIG. 19. Its longitudinal edges are stepped as shown. The last step 47 is situated at the transition to the slot 44.

By the central angle of the segment 14 is meant here the angle subtended by the segment at the centre of the press, as shown in FIGS. 17 and 18. In this definition the fact that the outer cylindrical surface of the segment 14 can if desired run tangentially where it projects beyond the surface F, is neglected.

I claim:

1. A press comprising a die support beam, press cylinder means having a cylinder axis, a plurality of segments extending between said die support beam and said press cylinder means and spaced apart around said cylinder axis, and connection means connecting each segment to said die support beam and said cylinder means, said connection means comprising two radially outwardly projecting collars, one on said die support beam and the other on said cylinder means, each of said collars presenting an abutment surface facing axially outwards, and grooves on the inner surfaces of said segments accommodating said collars and having surfaces complementary to said abutment surfaces of said collars, said segments having part cylindrical inner and outer surfaces and being formed with respective longitudinally extending slots the solid cross-sectional area of each segment in the region of said slot having a centroid lying on an imaginary line joining the centroids of said complementary surfaces of said grooves in said inner surface of said inner segment.

2. A press according to claim 1, wherein said connection means further comprises anchor pieces fixedly connected to said die support beam and to said press cylinder means between said segments and tangentially disposed bolts connecting said segments to said anchor pieces.

3. A press according to claim 2, wherein said press cylinder means includes a plurality of auxiliary rams mounted on said anchor pieces.

4. A press according to claim 1, wherein said abutment surfaces presented by said collars and said complementary surfaces of said grooves are inclined axially outwardly and radially outwardly whereby interengagement between said abutment surfaces and said complementary surfaces restrains said segments from both axial and radial movement relatively to said die support beam and said cylinder means.

5. A press according to claim 1, wherein said press cylinder means comprises a hollow cylinder and an end cover, detachably connected to said cylinder, said other collar being formed on said end cover.

6. A press according to claim 5, wherein said cylinder means further includes auxilary rams mounted on said end cover.

7. A press according to claim 1, further comprising an ingot receiver and a plunger carriage, both mounted to slide along longitudinal edges of said segments.

8. A press according to claim 7, further comprising ram means disposed in said slots and adapted to slide said ingot receiver and said plunge carriage along said longitudinal edges of said segments.

9. A press according to claim 8, including distance pieces inserted between said segments and said die support block and between said segments and said cylinder means whereby inward bowing of said segments under tension is prevented.

10. A press according to claim 1, wherein said abutment surfaces have less circumferential extent than said complementary surfaces whereby the centroid of said abutment surface coincides with the centroid of the area of a cross-section of the segment taken through the groove.

11. A press according to claim 1, wherein the centroid of the cross-sectional area of metal of each of said segments, at all points along said segment between said grooves, lies in an imaginary line joining the centroids of said abutment surfaces of said collars on said die support beam and said cylinder means.

References Cited
UNITED STATES PATENTS

| | | | |
|---|---|---|---|
| 2,654,310 | 10/1953 | Muller | 100—214 |
| 3,024,676 | 3/1962 | Howahr et al. | 72—456 |
| 3,210,978 | 10/1965 | Scheil | 72—253 |
| 3,350,910 | 11/1967 | Müller | 72—253 |

JOHN F. CAMPBELL, Primary Examiner

A. L. HAVIS, Assistant Examiner

U.S. Cl. X.R.

72—456; 100—214